INVENTOR.
WILLIAM W. POWELL
BY
Robert Thompson
ATTORNEY.

United States Patent Office 3,526,882

Patented Sept. 1, 1970

3,526,882

THIN FILM DEVICE

William W. Powell, Manhattan Beach, Calif., assignor to Hughes Aircraft Company, Culver City, Calif., a corporation of Delaware Continuation-in-part of application Ser. No. 493,456, Oct. 6, 1965. This application Jan. 2, 1968, Ser. No. 700,318
Int. Cl. G11c *5/06, 11/14*
U.S. Cl. 340—174 14 Claims

ABSTRACT OF THE DISCLOSURE

A magnetic device including two layers of parallel conductor members connected in series circuit so that the inner conductors generate a cumulative magnetic field in a predetermined area and the outer conductors generate an opposing and cancelling magnetic field at the fringe areas, and a thin film magnetic element sandwiched between the conductor members being magnetically coupled to the field generated inner conductor members.

This application is a continuation-in-part of copending U.S. patent application of William W. Powell, Ser. No. 493,456, filed Oct. 6, 1965, entitled "Thin Film Device," now abandoned.

This invention relates generally to thin film devices and relates more particularly to improvements in thin magnetic film devices of the type that can be utilized in digital memories.

In the computer technology, continued emphasis has been placed on reducing the size, the weight, and the power requirements. For example, thin magnetic film structures are presently being used in digital computer memories in increasing numbers. Usually, these thin film structures include a thin element of magnetic material which exhibits uniaxial anisotropic properties identified by an axis of anisotropy (preferred or easy access of magnetization). If an external magnetic field were to be applied across the magnetic film and then removed, any remanent magnetization would be oriented parallel to the axis of anisotropy. This remanent magnetization can be represented by a vector and can be pointed in either one of two possible directions parallel to the axis of anisotropy.

To utilize the thin magnetic film device as a memory element, one vectorial direction of the remanent magnetization can be arbitrarily chosen to represent a digital storage condition such as a digital ONE and the other vectorial direction as a digital ZERO. In other words, a digital ONE might be represented by the remanent magnetization vector pointing from right to left parallel to the axis of anisotropy while a digital ZERO might be represented by the magnetization vector pointing from left to right. Since the vectorial direction of the remanent magnetization can be controlled by externally applied magnetic fields, it is possible to switch each magnetic film element to store either a ONE or a ZERO. Thereafter, the stored condition can be determined by applying another magnetic field to the thin film device and detecting the resulting effect on the remanent magnetization.

It is an object of this invention to provide improvements in the above type of thin magnetic film devices which have the advantage of low electrical power requirements for switching and interrogating the device.

Another object is to provide a thin magnetic film memory device which has the advantage of significant magnetic isolation between individual memory elements whereby dense storage per unit of volume can be attained.

Still another object is to provide improvements in the magnetic field generating windings associated with a thin, magnetic film element.

The above and other objectives may be attained by providing a device including a thin magnetic film element and a magnetic field generating conductor, which has a plurality of parallel spaced-apart members mounted near the thin film element such as in a plane adjacent to the plane of the surface of the thin film element. The individual members are all interconnected in series circuit relationship so that the inner members are operable to serially pass an electrical current in one direction through an area defined on the surface of the thin film element and so that the outer members are operable to serially return the current in an opposite direction between each inner pass. A substantially identical magnetic field generating conductor is mounted in a plane adjacent to the other surface of the thin film element and operates in substantially the same manner except that the same current is serially fed to it and is conducted in the opposite direction of the corresponding members in the other layer. Several advantages of this arrangement are that the cumulative magnetic field created by a relatively small current in the inner members has sufficient magnitude to affect the magnetization of the thin magnetic film element and that the magnetic field generated by the current in the outer members cancels and reduces a portion of the magnetic field strength at the cumulative magnetic field fringe area, thereby creating significant magnetic isolation for the device.

In one arrangement, a magnetic memory array is constructed in which thin magnetic film elements having uniaxial anisotropic characteristics are laid down in a matrix. The conductors are arranged so that each conductor passes over and under a plurality of thin magnetic film elements in the above described manner, thereby forming a word line or a digit line. When an electrical current is applied to the conductor, only those thin magnetic film elements associated with the conductor will be affected by the magnetic field, wherein those magnetic elements in adjacent rows or columns and in adjacent layers will not be substantially affected by the fringe area magnetic field which is generated by the conductors.

Other objects, features, and advantages of this invention will become apparent upon reading the following description of an embodiment and referring to the accompanying drawings in which:

FIG. 1 is a schematic representation of a thin magnetic film element which exhibits uniaxial anisotropic properties;

FIGS. 2*a* and 2*b* are graphical illustrations of representative magnetic fields which when applied to the thin magnetic film element can affect a write or read operation therewith;

Figures 3, 4:
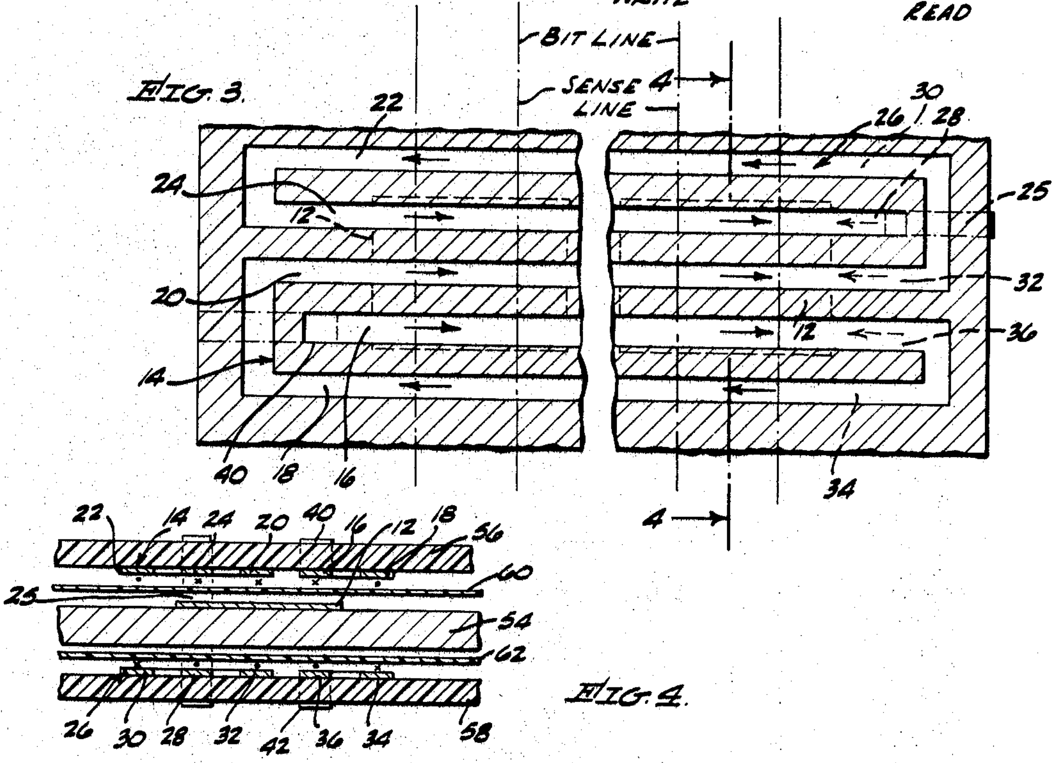
FIG. 3 is a top plan view of a preferred thin magnetic film device in which a conductor is arranged for generating a magnetic field which is applied across a thin magnetic film element.
FIG. 4 is a cross-sectional view taken down through a plane 4—4 of FIG. 3, in which the stacked relationship of a possible thin magnetic film device is illustrated.
Figure 5:
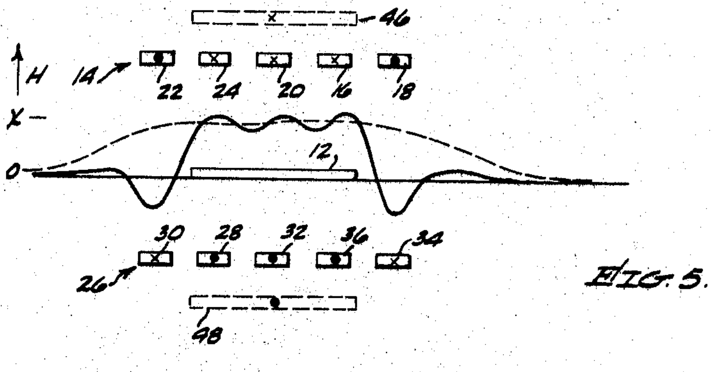
Figure 6:
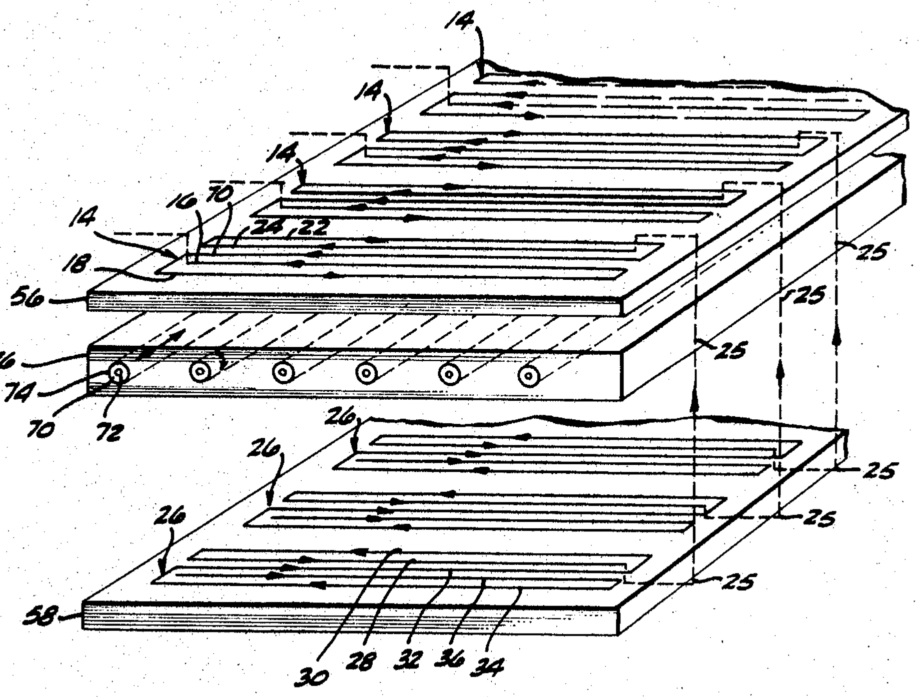

FIG. 5 is a graph illustrating a magnetic field applied to the thin magnetic film element by the conductor of FIGS. 3 and 5 relative to the magnetic field (dotted line) generated by a single conductor heretofore used; and FIG. 6 is a perspective view of a second embodiment of a thin film memory in which plated wire thin film magnetic elements are sandwiched between the two layers of conductor members.

Figure 1:
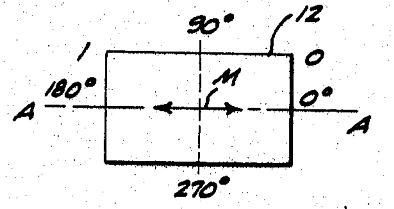

Referring now to the drawings, FIG. 1 is a schematic representation of a thin magnetic film element 12 which exhibits uniaxial anisotropic properties identified by an axis of anisotropy A—A. A characteristic of the uniaxial anisotropic property is that any remanent magnetization M has a tendency or preference for an orientation parallel to the axis of anisotropy A—A and is vectorially pointed in either one of the two possible directions therealong. The two possible vectorial directions of the remanent magnetization M can be arbitrarily selected to represent two possible digital storage conditions. For example, the remanent magnetization M, when vectorially pointed from left to right toward a 0° reference point can represent a digital ZERO storage condition. Alternatively, the remanent magnetization M when vectorially pointed from right to left toward a 180° reference point can represent a digital ONE storage condition.

Figure 2A:
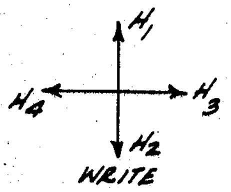

To write such digital information, a pair of intersecting magnetic fields, such as is graphically illustrated in FIG. 2*a*, are applied externally across the thin magnetic film element 12 to vectorially rotate the remanent magnetization M off the axis of anisotropy A—A through an angle and let it rotatably return to a preferred orientation parallel to the axis of anisotropy A—A vectorially pointed in a selected direction therealong. For example, a magnetic field $H_1$ or $H_2$ can be applied transverse to the axis of anisotropy A—A for rotating the remanent magnetization M toward a 90° reference point, or toward a 270° reference point, respectively. In addition, a second magnetic field $H_3$ or $H_4$ can be applied parallel to the axis of anisotropy A—A so that the resultant magnetic field developed when it is combined with a transverse magnetic field such as $H_1$, will vectorially rotate the remanent magnetization M to an angle $\angle M$, where $0° < \angle M < 90°$ or $90° < \angle M < 180°$, respectively. In other words, when the magnetic field $H_1$ is removed, the remanent magnetization M rotatably returns to an orientation parallel to the axis of anisotropy A—A and vectorially points from left to right (0°) if combined magnetic fields $H_1$ and $H_3$ were applied. Alternatively, the remanent magnetization M vectorially points from right to left (180°) if combined magnetic fields $H_1$ and $H_4$ were applied. Thus, a digital ZERO or a digital ONE can be written and stored in the thin magnetic film element, depending upon the selection of the magnetic fields.

Figure 2B:

To interrogate or read the storage condition of the thin magnetic film element 12, a magnetic field $H_5$ or $H_6$ (FIG. 2*b*) is applied transverse to the axis of anisotropy A—A for rotating the remanent magnetization M. Such rotation of the magnetization vector M induces a change in a sense conductor (not shown) which is magnetically coupled with it. For example, with a digital ZERO storage condition, the remanent magnetization M is vectorially oriented from left to right. Thus, if a magnetic field $H_5$ were applied to the thin magnetic film element 12, vectorial rotation of the magnetization vector M will induce a sense signal of a first polarity in the sense conductor. Alternatively, with a ONE storage condition, the remanent magnetization M is vectorially pointed from left to right. Thus, if the transverse magnetic field $H_5$ were applied to the thin magnetic film element 12, the vectorial rotation of the remanent magnetization M induces a signal of an opposite polarity on the sense conductor. Upon removal of the transverse field $H_5$ during reading, the magnetization may return the condition of the magnetization M if nondestructive reading is being performed.

It should of course be understood that other techniques can be used for establishing and interrogating the remanent magnetization in the thin magnetic film element 12 and that the above discussion of rotational switching is merely meant to be explanatory of a switching operation with uniaxial anisotropic properties of the schematically illustrated magnetic material.

Referring now to the details of the thin film device, FIGS. 3 and 4 are considered together since they illustrate different views of the same structure. No axis of anisotropy A—A has been identified in these figures since, although the magnetic field generating means is preferably used to generate a transverse magnetic field for a plurality of bits such as a word line, it can be utilized to generate magnetic fields parallel to the axis of anisotropy in other configurations if desired. Structurally, a plurality of thin magnetic film elements 12 are positioned near enough to an upper magnetic field generating conductor 14 and a lower magnetic field generating conductor 26 to attain magnetic coupling therewith.

In operation, the conductor 14, when conducting an electrical current, generates a magnetic field which is applied across the thin magnetic film element for affecting the remanent magnetization therein. More specifically, the conductor 14 is made up of a plurality of conductor members 16, 18, 20, 22, and 24 which structurally pass back and forth in a parallel, or side-by-side relation within a plane adjacent to the plane of the surface of the thin magnetic film member 12. It should, of course, be understood that it is not a critical requirement for the individual members to be within the same plane. These individual members are all connected in series circuit relationship with one another at their ends whereby the same current will pass serially through each member in a selected sequence.

The individual members of the conductor 14 are operably arranged so that an electrical current applied at an input end of the conductor serially passes near the surface of each thin film element 12, through an area or space bounded by the edges of or the surface area of the thin magnetic film elements 12 a plurality of times in one direction (left to right) by means of the inner members 16, 20, and 24 and creates a cumulative magnetic field which is applied across the thin magnetic film elements 12. In addition, the current is serially returned (right to left) between each such inner pass, by means of the outer conductors 18 and 22 through an area outside an area bounded by the edges of the thin magnetic film elements 12 and generates a magnetic field that partially cancels and reduces a portion of the cumulative magnetic field in a fringe area. Also within the scope of the invention, the fringe area may be established at any desired position relative to the thin film, such as adjacent to the edges, for defining bit storage areas within the thin film element 12. Thus, the magnetic element of interest is a discrete area bounded within the total area of the thin film element 12.

The conductor 14 is superposed above the lower magnetic field generating conductor 26 which is congruent with it and is positioned within a lower plane parallel to the plane of the surface of the thin magnetic film element 12. Of course, in another configuration, it may be possible to use a single conductor for the lower conductor 26. These two conductors 14 and 26 are both connected in series circuit relationship with one another by a circuit connection 25. Thus, the other or lower conductor 26 serially conducts the same current in the same manner except that current direction in the individual elements 28, 30, 32, 34 and 36 is opposite to the current direction in the corresponding elements of the conductor 14 as represented by the arrows with the dash line tails. As a result, the cumulative magnetic fields of the conductor 14 and the conductor 26 are added together when applied across the thin magnetic field element 12.

In overall operation, a current is applied to an input terminal 40 of the conductor 14 and is first conducted through the inner member 16 from left to right through an area defined by the surface area of the thin magnetic film member, is crossed over to the outer member 18, and is conducted in a return pass along a path through an area outside the bounds of the magnetic elements 12. For the next pass, the current crosses inward and is conducted adjacent the thin magnetic film elements on the inner member 20 in the same direction (left to right)

as the current flow in the inner member 16 and, at the end thereof, crosses over to the outer member 22 where it is returned back (right to left). Thereafter, the current crosses inward to the inner member 24 and again passes across the area defined by the thin magnetic field element 12 in the same direction as it previously passed in inner members 16 and 20. When the current reaches the end of the inner member 24 it is transferred by means of a circuit connection 25 (shown in phantom line representation) down to the lower conductor 26.

As previously stated, the lower conductor 26 is congruent with the conductor 14 and is therefore not visible in the plan view of FIG. 3. It should be understood that the current in conductor 26 will retrace the pattern it made in the conductor 14 as indicated by the arrows illustrated in dashed line representation. This retracing operation is better understood when reference is also made to FIG. 4 in which the individual members 28, 30, 32, 34 and 36 are illustrated in cross-sectional end view.

In operation, the current from circuit connection 25 is first applied to the end of the linear element 28 and conducted from right to left (FIG. 3) or out of the plane of the drawing (FIG. 4). For purposes of description, the current direction has been represented by a dot (.) when the current flow is out of the plane of the drawings of FIG. 4, and is represented by an $x$ when the current flow is into the plane of the drawings. The dot (.) of FIG. 4 corresponds to current flow from right to left in FIG. 3 and the $x$ corresponds to a current flow from left to right. Thus, relative to FIG. 3, the current is conducted on an inner member 28, and flows from right to left beneath the corresponding inner member 24. It then crosses over and to an outer member 30 and flows from left to right under the corresponding outer member 22. The current then crosses back to an inner member 32 and flows from right to left under the corresponding inner member 20. The current then crosses over to an outer member 34 where it is conducted from left to right under the corresponding outer member 18. When the current reaches the end of outer member 34, it crosses back into an inner member 36 where it then flows from right to left under the corresponding inner member 16 to an output terminal 42.

Thus, the current makes a total of six inner passes across an area defined by the two surface areas of the thin magnetic film elements 12 to generate a cumulative magnetic field which is coupled across the element. The four outer current passes generate magentic fields which have directions opposite the cumulative field generated by the inner passes in the same plane, and tend to cancel out a portion of the magnetic field in the fringe area. Of course, a different number of current passes will occur if a different number of members is provided.

A representative magnetic field strength H which would be generated by the above operation and applied across the thin magnetic film element 12 is represented by the solid line curve in the graph of FIG. 5. The vertical axis of the graph represents the magnetic field strength H of the component parallel to the plane of the thin film element 12. The horizontal axis represents the physical dimensions of the circuit components taken through a plane similar to the cross-sectional plane of FIG. 4, and accordingly, the members 16–24 of the conductor 14, the members 30–36 of the conductor 26, and the thin magnetic film element 12 are above and below the horizontal axis. Thus, with a current magnitude I, a magnetic field, having average intensity of $H=X$, would be generated by the inner members and applied across the thin magnetic film element 12. The outer members tend to reduce the magnetic field strength H in the fringe area whereby the magnetic field strength is reversed in the space between two corresponding outer members and again becomes slightly positive and asmyptotically approaches zero strength. In addition, the magnetic field in fringe areas above the upper conductor 14 and in the fringe area below the lower conductor 26 are significantly reduced by the opposing and canceling field.

If a single conductor including elements 46 and 48, which are illustrated in dotted line in FIG. 5, were used, it would take a current of magnitude 3I to generate a magnetic field represented graphically by the dashed line. As a result, the same average magnetic field intensity $H=X$ would be generated across the thin magnetic film element 12 wherein the magnitude or intensity of the magnetic field in the fringe area would be significantly higher than in the previously described device which embodies features of the invention.

Several advantages attained by the embodiment of FIGS. 3 and 4 are that a magnetic field having a sufficient magnitude to affect the uniaxial anisotropic properties of the thin magentic film element 12 is generated by a relatively low current. In addition, the same low current in the conductors is also utilized to substantially reduce the magnetic field intensity H in the fringe area of the magnetic field wherein the magnetic field intensity is significantly reduced below the comparable magnetic field generated by other means. Consequently, it is possible to space additional rows or columns of thin magnetic film elements 12 relatively close to other rows or columns and to stack additional layers of memory elements without a significant magnetic creep problem developing due to a repeated interrogation of adjacent elements. As a result of the low current requirements of the above described conductor, it is possible to use economical semiconductor current drive sources such as integrated circuit components.

Referring back to FIGS. 3 and 4, one thin film device has been constructed and tested with approximately the following dimensions and the following materials. The thin magnetic film element 12 was made of 81% nickel and 19% iron by weight in a film 1000 A. thick and had a length of 60 mils and a width of 30 mils. The thin magnetic film was deposited on the substrata 54 of glass, such as Corning Micro Sheet No. 0211 which is an alkali, zinc, borosilicate, described in Corning Glass Works Bulletin CCP 2/5M/9–62. The substrata was about 6 mils thick. The conductors 14 and 26 are of copper, one mil thick, and were printed or etched on backing sheets 56 and 58 made of a cured, fibreglass-impregnated, epoxy resin. Each individual member 16–24 and 28–36 is about 6 mils wide and is separated from the adjacent one by a 6-mil space. To electrically isolate the conductor 14 from the thin magnetic film element 12 and to bond the entire lamina together, one-mil thick sheets 60 and 62 of noncured, fibreglass-impregnated epoxy resin are positioned between the thin magnetic film element 12 and the conductor 14 and between the conductor 26 and the substrata 54, respectively. In final assembly, the entire lamina is pressed together and subjected to heat so that the sheets 60 and 62 are cured to bond the entire structure together.

In operation, a current of between 170 milliamps and 200 milliamps with a rise time of 60 nanoseconds was applied between the input and output terminals, whereupon rotation of the remanent magnetization was detected.

It should of course be understood that the above-stated dimensions, material, and operating parameters are only exemplary of a single structure that has been built and tested and should not be considered as a limitation of the inventive features included herein.

To operate the thin film device as a digital memory unit the conductors 14 and 26 illustrated in FIG. 3 extend generally parallel to an axis of anisotropy A—A and generate a transverse magnetic field corresponding to the magnetic field $H_1$ or $H_2$ of FIG. 2$a$ and can be considered as the word field winding. As previously stated, this transverse magnetic field rotates the remanent magnetization M from the axis of anisotropy A—A. A bit line (illustrated in phantom line representation) extends transversely across the axis of anisotropy A—A and generates magnetic fields corresponding to the magnetic field $H_3$ and $H_4$ of FIG. 2 parallel to the axis of anisotropy A—A for determining whether a ZERO or a ONE storage condition will result.

This same bit line can also be used as a sense line when the memory cells are interrogated. In other words, when the word conductors 14 and 26 generate the transverse read magnetic field to rotate the stored remanent magnetization M, an electrical signal is induced on the sense line. The polarity of this induced electrical signal corresponds to the direction which the remanent magnetization M was pointing when it was rotated. Thus, it is possible to sense whether a digital ZERO or a digital ONE storage condition existed by detecting the polarity of the induced sense signal.

Another embodiment of a memory, illustrated in FIG. 6, includes two sheets 56 and 58 containing the thin film multiple pass conductors 14 and 26, which are magnetically coupled to a thin magnetic film memory means configured as plated wires 70. The plated wires are arranged as a plurality of spaced-apart parallel elements in a layer sandwiched between the sheets 56 and 58 containing the multiple pass conductors 14. The areas on the plated wires, at the intersections with the transversely extending multiple pass conductors 14 and 26, adjacent each side of plated wire, operate as memory elements or memory areas, as will be explained in more detail shortly.

As previously described with reference to FIG. 3, wherein like elements have the same reference characters, the three inner conductor members 16, 20 and 24 in one layer all conduct the current in a first direction, while the two outer conductor members 18 and 22 conduct the current in a second direction. In the other layer, the three innermost conductor members 28, 32 and 36 all conduct the current in the second direction (opposite the direction of current flow in the inner conductor elements of the other layer), while the two outer conductor members 30 and 34 conduct the current in the first direction. The magnetic fields generated by the inner conductor members of the two sheets 56 and 58 complement one another in an additive manner and the outer conductor members in the two sheets complement one another in an additive nature but oppose and cancel out the fringe area magnetic field generated by the inner conductor. These magnetic fields are coupled to the plated wires at the areas of intersection defined thereon.

Each one of the plated wires in the layer sandwiched between the two layers of conductor members can be of a conventional type including a cylindrical wire 72 of beryllium copper which operates as a substrate. The surface of the cylindrical wire 72 is plated with a layer of magnetic material 74 such as permalloy which will exhibit anisotropic properties if plated in a unidirectional magnetic field. For example, the axis of anisotropy can be either axial as indicated by the solid line arrow or be circumferential as indicated by the dashed line arrow whereupon the conductors 14 could be used as a combination digit and sense line, or as a word line, respectively. In both instances, each intersection of the plated wires and the inner ones of conductor 14 defines an area which will function as a bit storage element or bit storage area.

A plurality of the plated wires 70 are arranged in a parallel array and enclosed within apertures in a layer of material 76 such as fiberglass impregnated epoxy resin which will structurally support the plated wires 70 in parallel spaced-apart relationship and electrical insulation without substantially affecting the magnetic coupling between the plated wires and the conductors 14. Of course, it can be possible in certain embodiments to eliminate the layer of material 76 and make the plated wires 70 self-supporting.

In operation, when current is supplied to a conductor 14, the remanent magnetization of the plated layer of magnetic material 74 is affected by the resulting magnetic field, thereby inducing an output signal which has a polarity or amplitude that is related to the orientation of the remanent magnetization in the plated layer of permalloy For example, if the plated layer of magnetic material 74 has a circumferential axis of anisotropy, the generated magnetic field applied to the plated wire as a result of current flow through a conductor 14 operating as a word line, will result in rotation of the remanent magnetization at the area of intersection or bit storage area. As a result, an output signal is induced in the wire 72 having a polarity which is indicative of the orientation of the remnent magnetization. If, instead, the plated layer of magnetic material 74 has an axial axis of anisotropy, a generated magnetic field resulting from current flow through the wire 72 induces an output signal in the conductors 14 which now operate as digit and sense line.

An advantage of using the multiple pass conductor 14 with plated wire 70 is that current flowing in the outer conductor members of conductor 14 has the tendency to provide greater magnetic isolation between memory elements since adjacent bit storage areas will not be substantially affected by the fringe area magnetic field which would otherwise be generated by the conductors 14. In addition, magnetic creep, which could otherwise develop due to a repeated interrogation of adjacent bit storage area or elements, is significantly reduced, thereby permitting close density packing of the memory elements on the plated wire.

In the above description, the magnetic film has been sufficiently thin to operate with rotational switching under the influence of a transverse field and a bit field. In other arrangements, in accordance with the invention, storage and switching may be provided with films of various other thicknesses which may also be switched with only the application of a bit switching field of sufficient strength to overcome the $H_c$ of the material. Also, the principles of the invention are equally applicable to magnetic films or mediums having isotropic properties wherein the $H_c$ of the magnetic material could also be overcome with coincidence fields to switch the film. In addition, the principles of the invention are not limited to individual thin film elements for each bit or structurally discrete magnetic spots since it may be possible to utilize the principles of the invention with other suitable magnetic film configurations, including strips of magnetic film or sheets of magnetic film, wherein the magnetic isolation advantages would be especially useful for keeping the magnetic domains from spreading. In other words, each magnetic element could in reality be one of a possible plurality of discrete elemental areas within the larger area of a strip of sheet film of magnetic material.

While salient features have been illustrated and described with respect to a particular embodiment, it should be readily apparent that modifications can be made within the spirit and scope of the invention, and it is therefore not desired to limit the invention to the exact details shown and described.

What is claimed is:

1. In a magnetic device of the type including a magnetic film element and a magnetic field generating means magnetically coupled to the magnetic film element, an improvement in the magnetic field generating means comprising:

a plurality of current-conductor members arranged in side-by-side relationship, at least two adjacent ones of said members being positioned to pass across an area defined on the surface of the magnetic film element, and at least one other one of said members being positioned to pass across an area outside the bounds of the area defined on the magnetic film element, the said members being interconnected for serially conducting the same electrical current through the said at least two adjacent ones of said current-conductor members only in a first direction for producing a cumulative magnetic field and for conducting the electrical current through the said at least one other one of said members in a direction opposite the first direction.

2. The magnetic device of claim 1 in which said current-conducting members are interconnected in a planar array series circuit relationship by a conductor means coupled between the ends of individual ones of said current-conductor members for serially conducting the same electrical current through said two adjacent ones of said plurality of members in a first current direction and for serially conducting the same electrical current through said at least one other one of said plurality of members in an opposite current direction.

3. The magnetic device of claim 2 in which said plurality of current conducting members includes a first plurality and a second plurality of current conducting members, said first plurality of current conducting members being arranged in side-by-side spaced-apart relationship adjacent one face of said film element and said second plurality of current conducting members being arranged in side-by-side spaced-apart relationship adjacent the other face of said film element.

4. The magnetic device of claim 1 in which said plurality of current conducting members includes a first plurality and a second plurality of current conducting members, said first plurality of current conducting members being arranged in side-by-side spaced-apart relationship adjacent one surface of said film element and said second plurality of current conducting members being arranged in side-by-side spaced-apart relationship adjacent the other surface of said film element, the magnetic field generated by corresponding members in said first plurality and said second plurality of current conducting members being cumulative.

5. The magnetic device of claim 4 in which the thin film magnetic element exhibits uniaxial anisotropic properties.

6. The magnetic device of claim 5 in which the thin magnetic film element is a planar thin film.

7. The magnetic device of claim 5 in which the thin magnetic film element is a plated wire magnetic film element arranged transverse to said plurality of current conducting members.

8. The magnetic device of claim 4 in which the magnetic film element is a plurality of thin film magnetic members, each magnetically coupled to said plurality of current conducting members.

9. The magnetic device of claim 1 in which the thin magnetic film element is a plated wire magnetic film element arranged transverse to said plurality of current conducting members.

10. The magnetic device of claim 1 in which said magnetic film element is a plurality of thin film magnetic members, each magnetically coupled to said plurality of current conducting members.

11. In a magnetic device of the type including a magnetic film element and a magnetic field generating means magnetically coupled to the magnetic film element, an improvement in the magnetic field generating means comprising:

a plurality of current-conducting members arranged in side-by-side relationship, the inner ones of said members being positioned to pass across an area defined on the surface of the magnetic film element, and the outer ones of said members being positioned to pass across an area outside the bounds of the area defined on the surface of the magnetic film element, the said members each being interconnected in series circuit relationship with the other current conducting members for conducting the same electrical current through said inner ones of said members in a first current direction and for conducting the electrical current through the outer members in a current direction opposite the first current direction.

12. The magnetic device of claim 11 in which said current members are interconnected in series circuit relationship in a planar array for serially conducting the same electrical current through the inner ones of said current conducting members in a first current direction for producing a cumulative magnetic field oriented in a first transverse direction and conductor means coupled toward the ends of each of said current conducting members for serially conducting the same electrical current through the outer ones of said plurality of members in an opposite current direction between each conduction through an inner one of said current-conducting member.

13. The magnetic device of claim 11 in which said plurality of current conducting members includes a first plurality and a second plurality of current conducting members, said first plurality of current conducting members being arranged in side-by-side spaced-apart relationship adjacent one face of the magnetic film element and said second plurality of current conducting members being arranged in side-by-side spaced-apart relationship adjacent the other face of the magnetic film element.

14. A digital memory comprising: a plurality of thin magnetic film elements each having uniaxial anisotropic properties wherein any remanent magnetization will normally be oriented parallel to the axis of anisotropy and be pointed in either one of two directions therealong; magnetic field generating means magnetically coupled to all of said thin magnetic film elements for affecting the remanent magnetization thereof, said field generating means including a first plurality and a second plurality of current conducting members, said first plurality of members being arranged in side-by-side, spaced-apart relationship adjacent a first side of all of said film elements, and said second plurality of members being arranged in side-by-side, spaced-apart relationship adjacent other side of said film element, the inner ones of said members being positioned to pass across areas defined on the surfaces of said thin film element, and the outer ones of said members being positioned to pass across areas outside the bounds of the areas defined on the surfaces of said thin film elements, the said first plurality of members and the said second plurality of members being connected in series circuit, the said individual members of each of said plurality of members also being operably interconnected in series circuit relationship with one another for conducting the same electrical current serially through said inner members in a predetermined current direction and for serially conducting the electrical current through the outer members of the same plurality of members in an opposite current direction than in the said inner members whereby the inner members of said first plurality of members and of said second plurality of members generate a cumulative magnetic field which is applied to said thin magnetic film elements and the outer members of said first and second plurality of members generate canceling magnetic fields which reduce the magnetic field strength in the fringe areas of the cumulative magnetic field.

References Cited

UNITED STATES PATENTS

| | | | |
|---|---|---|---|
| 3,405,398 | 10/1968 | Johnson | 340—174 |
| 3,311,901 | 3/1967 | Fedde et al. | 340—174 |

JAMES W. MOFFITT, Primary Examiner

UNITED STATES PATENT OFFICE
CERTIFICATE OF CORRECTION

Patent No. 3,526,882 Dated September 1, 1970

Inventor(s) William W. Powell

It is certified that error appears in the above-identified patent and that said Letters Patent are hereby corrected as shown below:

Column 1, line 21, after "generated" insert -- by the --.

Signed and sealed this 15th day of December 1970.

(SEAL)
Attest:

EDWARD M.FLETCHER,JR.
Attesting Officer

WILLIAM E. SCHUYLER, JR.
Commissioner of Patents